United States Patent
Guo et al.

(10) Patent No.: US 11,483,414 B2
(45) Date of Patent: Oct. 25, 2022

(54) PICTURE SHARING METHOD, COMPUTER DEVICE, AND STORAGE MEDIUM

(71) Applicant: Tencent Technology (Shenzhen) Company Limited, Shenzhen (CN)

(72) Inventors: Licai Guo, Shenzhen (CN); Xunan Mao, Shenzhen (CN); Haibo Deng, Shenzhen (CN); Xinwei Gao, Shenzhen (CN); Chenchen Gu, Shenzhen (CN); Jing Lv, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 218 days.

(21) Appl. No.: 16/894,579

(22) Filed: Jun. 5, 2020

(65) Prior Publication Data

US 2020/0304587 A1    Sep. 24, 2020

Related U.S. Application Data

(63) Continuation of application No. PCT/CN2019/078957, filed on Mar. 21, 2019.

(30) Foreign Application Priority Data

Apr. 2, 2018    (CN) .......................... 201810283526.3

(51) Int. Cl.
*H04L 67/5651* (2022.01)
*H04N 19/124* (2014.01)
(Continued)

(52) U.S. Cl.
CPC ............ *H04L 67/5651* (2022.05); *H04L 9/40* (2022.05); *H04L 65/75* (2022.05); *H04L 65/765* (2022.05);
(Continued)

(58) Field of Classification Search
CPC ..... H04L 29/06; H04L 65/601; H04L 65/605; H04L 69/04; H04N 19/124; H04N 19/14;
(Continued)

(56) References Cited

U.S. PATENT DOCUMENTS 7,117,254 B2* 10/2006 Lunt ....................... H04L 67/02
                                                                     707/999.005
8,073,839 B2* 12/2011 Rathod ............... G06F 16/3331
                                                                     707/661
(Continued)

FOREIGN PATENT DOCUMENTS

CN       102104617 A      6/2011
CN       103179156 A      6/2013
(Continued)

OTHER PUBLICATIONS

Tencent Technology, WO, PCT/CN2019/078957, May 28, 2019, 4 pgs.

(Continued)

*Primary Examiner* — Thomas J Dailey
(74) *Attorney, Agent, or Firm* — Morgan, Lewis & Bockius LLP

(57) ABSTRACT

This application relates to a picture sharing method, a computer device, and a storage medium. The method includes: receiving a picture compressed in a first compression manner; obtaining characteristic information of the picture; compressing the picture in a second compression manner in a case that the characteristic information meets a compression trigger condition, to obtain a compressed picture; receiving a picture download request for the picture, wherein the second compression manner has a higher compression ratio than the first compression manner; and returning the compressed picture in response to the picture down-
(Continued)

load request. The solutions of this application reduce a network bandwidth occupied in a picture feedback process.

20 Claims, 10 Drawing Sheets

(51) Int. Cl.
| | |
|---|---|
| *H04N 19/14* | (2014.01) |
| *H04N 19/154* | (2014.01) |
| *H04L 67/06* | (2022.01) |
| *H04N 21/2343* | (2011.01) |
| *H04N 21/2668* | (2011.01) |
| *H04L 69/04* | (2022.01) |
| *H04N 21/2743* | (2011.01) |
| *H04L 9/40* | (2022.01) |
| *H04L 65/75* | (2022.01) |

(52) U.S. Cl.
CPC .............. *H04L 67/06* (2013.01); *H04L 69/04* (2013.01); *H04N 19/124* (2014.11); *H04N 19/14* (2014.11); *H04N 19/154* (2014.11); *H04N 21/234309* (2013.01); *H04N 21/2668* (2013.01); *H04N 21/2743* (2013.01)

(58) Field of Classification Search
CPC ......... H04N 19/154; H04N 21/234309; H04N 21/2668; H04N 21/2743
See application file for complete search history.

(56) References Cited

U.S. PATENT DOCUMENTS

| | | | | |
|---|---|---|---|---|
| 8,707,184 | B2* | 4/2014 | Chen ...................... | H04L 67/10 |
| | | | | 715/744 |
| 9,077,678 | B1* | 7/2015 | Hardman ................ | H04L 51/52 |
| 9,307,234 | B1 | 4/2016 | Greiner et al. | |
| 2005/0152607 | A1* | 7/2005 | D'Ortenzio ............ | H04N 1/411 |
| | | | | 382/232 |
| 2014/0136492 | A1* | 5/2014 | Lerios .................. | G06F 16/958 |
| | | | | 707/693 |
| 2015/0187092 | A1* | 7/2015 | Jezabek .................... | G06T 9/00 |
| | | | | 382/239 |

FOREIGN PATENT DOCUMENTS

| | | |
|---|---|---|
| CN | 105187491 A | 12/2015 |
| CN | 105245753 A | 1/2016 |
| CN | 105354505 A | 2/2016 |
| CN | 105430393 A | 3/2016 |
| CN | 106027486 A | 10/2016 |
| CN | 106254469 A | 12/2016 |
| CN | 108933945 A | 12/2018 |

OTHER PUBLICATIONS

Tencent Technology, IPRP, PCT/CN2019/078957, Oct. 6, 2020, 5 pgs.
Tencent Technology, ISR, PCT/CN2019/078957, dated May 28, 2019, 2 pgs.

* cited by examiner

PICTURE SHARING METHOD, COMPUTER DEVICE, AND STORAGE MEDIUM

CROSS-REFERENCE TO RELATED APPLICATIONS

This application is a continuation application of PCT Patent Application No. PCT/CN2019/078957, entitled "IMAGE SHARING METHOD, COMPUTER APPARATUS, AND STORAGE MEDIUM" filed on Mar. 21, 2019, which claims priority to Chinese Patent Application No. 201810283526.3, entitled "PICTURE SHARING METHOD AND APPARATUS, COMPUTER DEVICE, AND STORAGE MEDIUM" filed Apr. 2, 2018, all of which are incorporated by reference in their entirety.

FIELD OF THE TECHNOLOGY

The present disclosure relates to the field of computer technologies, and in particular, to a picture sharing method, a computer device, and a storage medium.

BACKGROUND OF THE DISCLOSURE

With the rapid development of Internet technologies, online information sharing has become a very important information sharing manner in daily life. Picture sharing is a common information sharing form.

In the related art, a picture sharing process includes as follows: A terminal that performs picture sharing uploads a picture to a server. After receiving the uploaded picture, the server directly stores the picture. A terminal that needs to obtain the picture may download, from the server, the picture uploaded by the picture sharing terminal. In this way, picture sharing is implemented.

Because the picture stored in the server usually has a relatively large size, a relatively large network bandwidth is occupied in a picture downloading process.

SUMMARY

Embodiments of the present disclosure provide a picture sharing method, a computer device, and a storage medium, to resolve a problem in the related art that a relatively large network bandwidth is occupied in a picture downloading process.

An embodiment of the present disclosure provides a picture sharing method, applied to a server having one or more processors and memory storing a plurality of programs to be executed by the one or more processors, and the method comprising:

obtaining a picture compressed in a first compression manner;

obtaining characteristic information of the picture;

compressing the picture in a second compression manner in a case that the characteristic information meets a compression trigger condition, to obtain a compressed picture, wherein the second compression manner has a higher compression ratio than the first compression manner;

receiving a picture download request for the picture; and returning the compressed picture in response to the picture download request.

An embodiment of the present disclosure provides a computer device, including a memory and a processor, the memory storing a computer program, the computer program, when executed by the processor, causing the processor to perform the following operations:

obtaining a picture compressed in a first compression manner;

obtaining characteristic information of the picture;

compressing the picture in a second compression manner in a case that the characteristic information meets a compression trigger condition, to obtain a compressed picture, wherein the second compression manner has a higher compression ratio than the first compression manner;

receiving a picture download request for the picture; and returning the compressed picture in response to the picture download request.

An embodiment of the present disclosure provides a non-transitory computer readable storage medium storing a computer program, the computer program, when executed by a processor, causing the processor to perform the following operations:

obtaining a picture compressed in a first compression manner;

obtaining characteristic information of the picture;

compressing the picture in a second compression manner in a case that the characteristic information meets a compression trigger condition, to obtain a compressed picture, wherein the second compression manner has a higher compression ratio than the first compression manner;

receiving a picture download request for the picture; and returning the compressed picture in response to the picture download request.

In the foregoing picture sharing method and apparatus, the computer device, and the storage medium, after the picture compressed in the first compression manner is received, the characteristic information of the picture is obtained. When the characteristic information meets the compression trigger condition, the picture is then compressed in the second compression manner. Such processing is equivalent to performing characteristic analysis on the picture and then determining whether to compress the picture based on an analysis result. The compressed picture obtained in this way can have a smaller size and meet a quality requirement to some extent. After the picture download request for the picture is received, the returned picture is also a compressed picture. Because the compressed picture has a smaller size than the received picture, a network bandwidth occupied in a picture feedback process is reduced.

An embodiment of the present disclosure provides a picture sharing method, applied to a terminal, and including:

receiving a picture sharing message;

transmitting a picture download request according to the picture sharing message, the picture download request being used for requesting to download a picture specified in the picture sharing message; and receiving a compressed picture fed back in response to the download request;

the compressed picture being obtained after a server compresses a target picture in a second compression manner, and the target picture being the picture compressed in a first compression manner.

An embodiment of the present disclosure provides a computer device, including a memory and a processor, the memory storing a computer program, the computer program, when executed by the processor, causing the processor to perform the following operations:

receiving a picture sharing message;

transmitting a picture download request according to the picture sharing message, the picture download request being used for requesting to download a picture specified in the picture sharing message; and receiving a compressed picture returned in response to the download request;

the compressed picture being obtained after a server compresses a target picture in a second compression manner, and the target picture being the picture compressed in a first compression manner.

An embodiment of the present disclosure provides a storage medium storing a computer program, the computer program, when executed by a processor, causing the processor to perform the following operations:

receiving a picture sharing message;

transmitting a picture download request according to the picture sharing message, the picture download request being used for requesting to download a picture specified in the picture sharing message; and receiving a compressed picture returned in response to the download request;

the compressed picture being obtained after a server compresses a target picture in a second compression manner, and the target picture being the picture compressed in a first compression manner.

In the foregoing picture sharing method and apparatus, the computer device, and the storage medium, a compressed picture is received, which is obtained by the server through compression in the second compression manner. Because the compressed picture has a smaller size than the picture compressed in the first compression manner and uploaded to the server, a network bandwidth occupied in a picture feedback process is reduced.

DESCRIPTION OF EMBODIMENTS

To make the objectives, technical solutions, and advantages of the present disclosure clearer, the following further describes the present disclosure in detail with reference to the accompanying drawings and embodiments. It is to be understood that the specific embodiments described herein are merely used for explaining the present disclosure, but are not intended to limit the present disclosure.

Figure 1A:
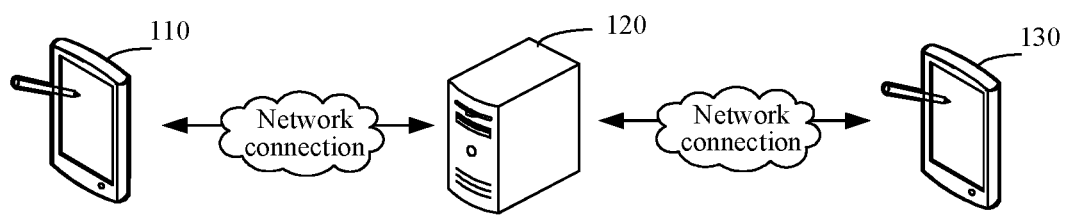
FIG. 1A is a diagram of an application scenario of a picture sharing method according to an embodiment.

FIG. 1A is a diagram of an application scenario of a picture sharing method according to an embodiment. Referring to FIG. 1A, the application scenario includes a first terminal 110, a server 120, and a second terminal 130. The first terminal 110 and the second terminal 130 each are connected to the server 120 by using a network.

In an embodiment, a social network application for social networking may be run in the first terminal 110 and the second terminal 130, and picture sharing is implemented by using the social network application that is run. It may be understood that functions of the first terminal 110 and the second terminal 130 may be interchanged for bidirectional communication.

The first terminal 110 may upload a picture to the server 120. In a process of uploading the picture, the picture is compressed in a first compression manner. In this way, the server 120 receives a picture compressed in the first compression manner. Then, the server 120 obtains characteristic information of the received picture. When the characteristic information meets a compression trigger condition, the server 120 compresses the received picture in a second compression manner, to obtain a compressed picture. A compression ratio of the second compression manner is higher than a compression ratio of the first compression manner.

The second terminal 130 transmits a picture download request to the server 120. After receiving the picture download request transmitted by the second terminal 130 for the picture uploaded by the first terminal 110, the server 120 returns the compressed picture to the second terminal 130 in response to the picture download request.

Figure 1B:
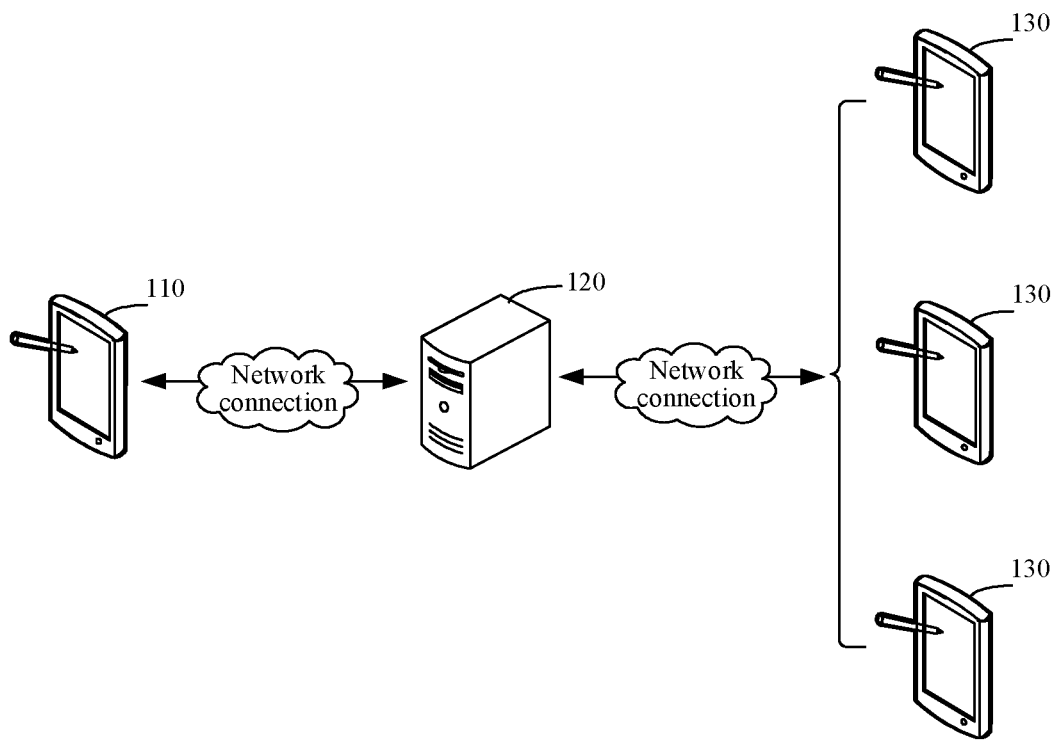
FIG. 1B is a diagram of an application scenario of a picture sharing method according to another embodiment.

It may be understood that the picture shared by the first terminal 110 may be downloaded by at least one second terminal 130. When there are a plurality of second terminals 130, an application scenario of the picture sharing method may be as shown in FIG. 1B. Each second terminal 130 may transmit the picture download request to the server 120. After receiving the picture download request transmitted by each second terminal 130, the server 120 returns the compressed picture to each second terminal 130 in response to the picture download request.

Figure 2:
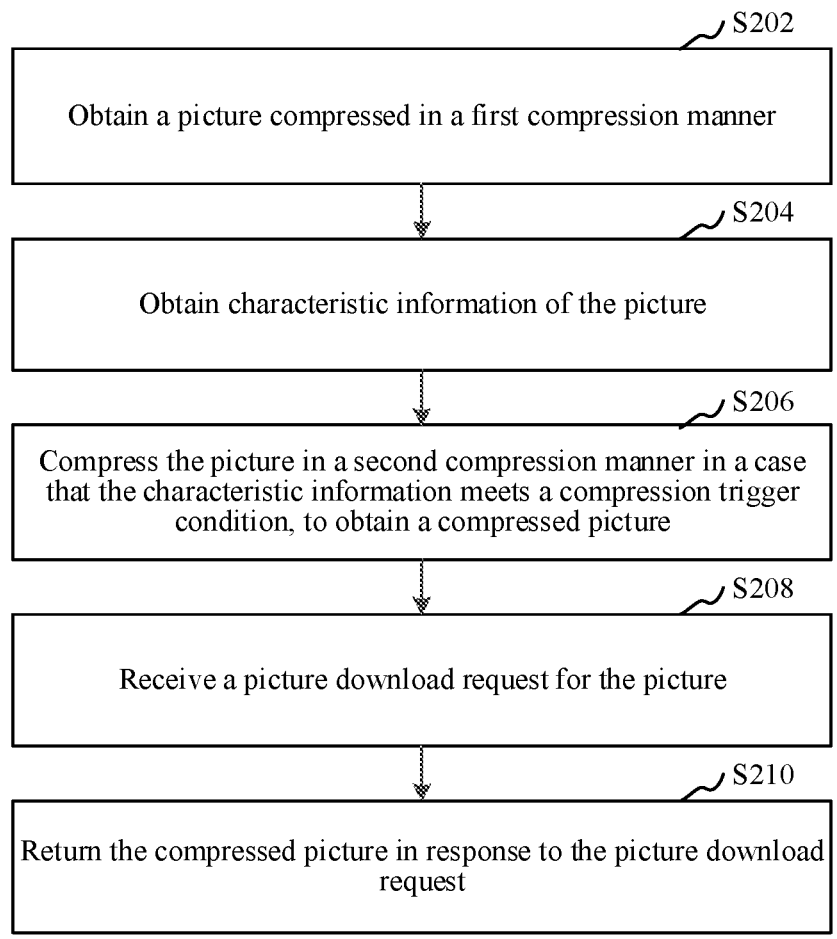
FIG. 2 is a schematic flowchart of a picture sharing method according to an embodiment.

FIG. 2 is a schematic flowchart of a picture sharing method according to an embodiment. In this embodiment, descriptions are provided mainly by using an example in which the picture sharing method is applied to the server 120 in FIG. 1. Referring to FIG. 2, the method includes the following steps:

S202: Receive a picture compressed in a first compression manner.

The compression manner is a manner used to compress a picture. Compressing the picture is reducing a size of the picture. The size of the picture is a size of storage space occupied by the picture.

In an embodiment, the compression manner includes at least one of a picture compression format and a compression quality parameter. The picture compression format is a format obtained after the picture is compressed by using a compression algorithm. The compression quality parameter is a parameter that represents picture compression quality.

In an embodiment, a picture compression format in the first compression manner may be any one of formats such as Portable Network Graphics (PNG), Joint Photographic Experts GROUP (JPG), H.264, and High Efficiency Video Coding (HEVC).

In an embodiment, the compression quality parameter includes a quantization parameter (QP) or an image quality factor (IQF). The QP is a sequence number of a quantization step (Qstep), and is used for reflecting a spatial detail compression status.

As an example, when the picture compression format is the HEVC format or the H.264 format, the compression quality parameter may be the QP. When the picture compression format is the JPG format, the compression quality parameter is the IQF.

It may be understood that, different picture compression formats correspond to different parameters for measuring picture quality, that is, different compression quality parameters.

The first compression manner in this specification is a compression manner used to compress a picture before the first terminal 110 in FIG. 1A uploads the picture to the server 120. It may be pre-configured whether the first compression manner includes both or either of the picture compression format and the compression quality parameter. In other words, the first compression manner is a pre-configured compression manner. In this way, each time the first terminal 110 needs to upload a picture, the configured first compression manner is directly used to compress the picture. In addition, which picture compression format and which compression quality parameter to be used may also be pre-configured, which is not specifically limited herein.

PNG is a raster-graphics file format that supports lossless compression. JPG is an international digital image compression standard. H.264 is a next-generation digital video compression format proposed by the International Organization for Standardization (ISO) and the International Telecommunication Union (ITU) together after MPEG4.

Specifically, a user may upload a picture to the server by using the first terminal. In an uploading process, the picture may be compressed in the first compression manner. In this way, the picture received by the server is a picture compressed in the first compression manner.

In an embodiment, the received picture includes a social shared picture. The social shared picture is a picture shared on a social network service (SNS) platform. It may be understood that, the SNS platform is a general name and refers to a platform for communication and interaction through a network. The SNS platform may include an instant messaging platform, a content sharing platform, and the like. The content sharing platform is a platform on which content is shared. The content may include a web log, news information, and the like. The web log refers to a log published by a user through a network.

In an embodiment, the user may upload a social shared picture to the server by using a social network application run in the first terminal. In an uploading process, the social shared picture may be compressed in the first compression manner. In this way, the picture received by the server is a social shared picture compressed in the first compression manner.

It may be understood that, the social shared picture received by the server may be a picture to be shared in a social group, a picture to be shared in a one-to-one social conversation, or a picture to be shared in a social page, which is not specifically limited in this embodiment of the present disclosure.

The social group may be a permanent group or a temporary group. The social page is a page used for displaying and sharing social information. For example, WeChat Moments is a social page, and may be used for displaying various social information of WeChat users. WeChat Moments refers to a social function of WeChat.

S204: Obtain characteristic information of the picture.

The characteristic information of the picture is information reflecting a characteristic of the picture.

In an embodiment, the characteristic information includes at least one of a picture characteristic and a social characteristic. That is, the characteristic information may include only the picture characteristic or only the social characteristic, or may include both the picture characteristic and the social characteristic.

The picture characteristic refers to a characteristic of the picture itself. In an embodiment, the picture characteristic includes a picture dimension and/or a picture size. That is, the picture characteristic may include only the picture dimension or only the picture size, or may include both the picture dimension and the picture size.

The social characteristic may be a characteristic in a social aspect involved in a process of sharing the picture. In an embodiment, the social characteristic includes at least one of a group attribute, a social object attribute, and a sharing time. The group attribute is an attribute of a social group in which the picture is to be shared. The social object attribute is an attribute of a social object with whom the picture is to be shared.

In another embodiment, the social characteristic may further include a social page attribute. The social page attribute may be a quantity of social objects included on the social page, which is not specifically limited herein. That is, the social characteristic may alternatively be at least one of the group attribute, the social object attribute, the sharing time, and the social page attribute.

S206: Compress the picture in a second compression manner in a case that the characteristic information meets a compression trigger condition, to obtain a compressed picture.

The compression trigger condition is a preset condition for triggering compression processing. It may be understood that when the compression trigger condition is met, the compression processing is triggered.

A compression ratio is a ratio of a size of a file after compression to a size of the file before the compression. The compression ratio may also be referred to as compression efficiency, and is used for reflecting a compression effect. A higher compression ratio indicates a better compression effect; conversely, a lower compression ratio indicates a worse compression effect. In addition, a value of the compression ratio is inversely correlated to a size of a compressed picture. A higher compression ratio indicates a smaller compressed picture, and a lower compression ratio indicates a larger compressed picture.

The server may compare the characteristic information with the compression trigger condition, and compress the picture in the second compression manner when the characteristic information meets the compression trigger condition.

As an example, a compression ratio of the second compression manner is higher than a compression ratio of the first compression manner. It may be understood that, because the compression ratio of the second compression manner is higher than the compression ratio of the first compression manner, the compressed picture obtained after the compression in the second compression manner is smaller than the picture received by the server. A size of a picture described in the embodiments of this application is a size of storage space occupied by the picture.

In the embodiments of this application, the terms "first" and "second" are merely used for distinguishing, but are not used for limitations in aspects such as order, subordination, and size.

In an embodiment, the second compression manner may include at least one of a picture compression format and a compression quality parameter. The picture compression format in the second compression manner may be any one of formats such as PNG, JPG, H.264, and HEVC.

The second compression manner in this specification is a compression manner used to compress a picture before the server 120 in FIG. 1A returns the picture to the second terminal 130. It may be pre-configured whether the second compression manner includes both or either of the picture compression format and the compression quality parameter. In other words, the second compression manner is a pre-configured compression manner. In this way, each time the server 120 needs to return a picture to the second terminal 130, the configured second compression manner is directly used to compress the picture. In addition, which picture compression format and which compression quality parameter to be used may also be pre-configured, which is not specifically limited herein.

The picture compression formats in the first compression manner and the second compression manner are not limited to the formats listed above. The picture compression format in the second compression manner may be the same as or different from the picture compression format in the first compression manner. To ensure that the compression ratio of the second compression manner is higher than the compression ratio of the first compression manner, when the picture compression format in the second compression manner is the same as the picture compression format in the first compression manner, a compression ratio of the compression quality parameter in the second compression manner is higher than a compression ratio of the compression quality parameter in the first compression manner.

In an embodiment, the server may store the compressed picture. It may be understood that storing the compressed picture may save storage space of the server.

In an embodiment, in addition to the compressed picture, the server may further store the received picture that is not compressed in the second compression manner. That is, the server may further store the picture compressed in the first compression manner.

S208: Receive a picture download request for the picture.

The picture download request is used for requesting to download the picture uploaded by the first terminal.

Specifically, the second terminal may generate the picture download request for the picture, and transmit the picture download request to the server. The server receives the picture download request.

In an embodiment, after obtaining the compressed picture in step S206, the server may generate a picture sharing message, and transmit the picture sharing message to the second terminal. The second terminal generates the picture download request by triggering the picture sharing message. The picture sharing message is a message used for sharing the picture. In an embodiment, the picture sharing message may be an instant messaging message. For example, when the picture is transmitted in a social group or a one-to-one social conversation, the picture sharing message is an instant messaging message. It may be understood that the picture sharing message may alternatively be a message in a notification form.

S210: Return the compressed picture in response to the picture download request.

Specifically, the server may return the compressed picture to the second terminal in response to the picture download request. It may be understood that the server may directly return the compressed picture. Alternatively, the server may further process the compressed picture, and then return a picture obtained after the further processing. For example, the server may perform format conversion on the compressed picture, and return a picture obtained after the format conversion.

In an embodiment, the method further includes: directly storing the received picture when the characteristic information does not meet the compression trigger condition; and returning, when receiving the picture download request for the picture, the stored picture in response to the picture download request.

It may be understood that the server may directly return the stored picture in response to the picture download request. In an embodiment, the server may further obtain a picture format supported by the terminal transmitting the picture download request. When the directly stored picture does not conform to the picture format supported by the terminal transmitting the picture download request, the server may perform format conversion on the compressed picture according to the obtained picture format, and return a picture obtained after the format conversion.

Figure 3:
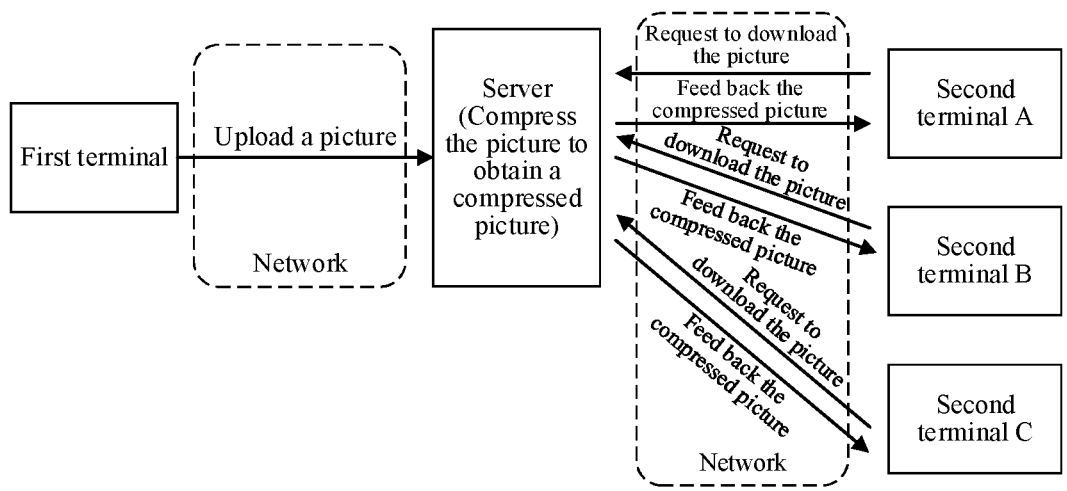
FIG. 3 is a schematic architectural diagram of a picture sharing method according to an embodiment.

FIG. 3 is a schematic architectural diagram of a picture sharing method according to an embodiment. Referring to FIG. 3, the first terminal uploads a picture to the server through a network. When characteristic information of the picture meets a compression trigger condition, the server compresses the picture to obtain a compressed picture. A plurality of second terminals (second terminals A to C) each may request to download the picture from the server through the network, and the server returns the compressed picture to the second terminals.

In the foregoing picture sharing method, after the picture compressed in the first compression manner is received, the characteristic information of the picture is obtained. When the characteristic information meets the compression trigger condition, the picture is then compressed in the second compression manner. Such processing is equivalent to performing characteristic analysis on the picture and then determining whether to compress the picture based on an analysis result. The compressed picture obtained in this way can have a smaller size and meet a quality requirement to some extent. After the picture download request for the picture is received, the picture returned is also a compressed picture. Because the compressed picture returned has a smaller size than the received picture, a network bandwidth occupied in a picture feedback process is reduced.

In an embodiment, the characteristic information may include only the picture characteristic. Using an example in which the picture characteristic includes the picture dimension, the compression trigger condition may include at least one of the following conditions: the picture dimension is within a preset dimension range; a product of a height and a width in the picture dimension is within a preset product range; and a ratio of the height to the width in the picture dimension is within a preset ratio range.

In an embodiment, the picture dimension includes a height and a width of the picture. The height and the width of the picture may be represented by using a unit of length, or may be represented by using a pixel unit. It may be understood that, when the height and the width of the picture are represented by using the pixel unit, the picture dimension is a picture resolution.

The preset dimension range is a preset range of the picture dimension. In an embodiment, the preset dimension range includes a preset height range and/or a preset width range. The preset product range is a preset range of the product of the height and the width. The preset ratio range is a preset range of the ratio of the height to the width.

In an embodiment, a maximum height threshold and a minimum height threshold are preset in the server, and therefore the preset height range is greater than or equal to the minimum height threshold and is less than or equal to the maximum height threshold. In an embodiment, a maximum width threshold and a minimum width threshold are preset in the server, and therefore the preset width range is greater than or equal to the minimum width threshold and is less than or equal to the maximum width threshold.

For example, if the maximum height threshold is Hmax, and the minimum height threshold is Hmin, Hmin≤the preset height range≤Hmax. For another example, if the maximum width threshold is Wmax, and the minimum width threshold is Wmin, Wmin≤the preset width range≤Wmax.

In an embodiment, the preset product range is greater than or equal to a first product threshold and is less than or equal to a second product threshold.

In an embodiment, the first product threshold and the second product threshold may be product thresholds that are preset separately. For example, the first product threshold Pmin and the second product threshold Pmax are preset.

In another embodiment, the first product threshold may be obtained according to a product of the minimum height threshold and the minimum width threshold, and the second product threshold may be obtained according to a product of the maximum height threshold and the maximum width threshold. In this embodiment, the maximum height threshold, the minimum height threshold, the maximum width threshold, and the minimum width threshold are preset. The first product threshold is obtained by determining the product of the minimum height threshold and the minimum width threshold, and the second product threshold is obtained by determining the product of the maximum height threshold and the maximum width threshold.

It may be understood that when the picture dimension of the picture received by the server is beyond the preset dimension range, or the product of the height and the width in the picture dimension is above the preset product range, or the ratio of the height to the width in the picture dimension is beyond the preset ratio range, the picture is a super long picture, a super large picture, or is a super small picture. The super long picture generally needs to be enlarged for view, and therefore subjective quality will be degraded after compression is performed again. The super large picture generally has very high picture quality, and therefore the picture quality will be greatly affected after compression is performed again. Because the super small picture is relatively small, secondary compression does not obviously reduce the picture size, but instead wastes a compression resource. Therefore, it is inadvisable to perform secondary compression on the super long picture, the super large picture, or the super small picture in the second compression manner.

In an embodiment, the preset ratio range is greater than or equal to a first ratio threshold and is less than or equal to a second ratio threshold. The first ratio threshold and the second ratio threshold may be ratio thresholds that are preset separately. In another embodiment, the first ratio threshold and the second ratio threshold may be obtained according to a ratio relationship set for the maximum height threshold, the minimum height threshold, the maximum width threshold, and the minimum width threshold.

In the foregoing embodiments, the compression trigger condition is set in a picture dimension aspect. Whether to trigger compression on the picture is determined by using the picture dimension of the picture. A picture that needs to be compressed can be determined more easily and quickly, thereby saving system processing resources.

In an embodiment, the characteristic information may include only the social characteristic. Using an example in which the social characteristic includes the group attribute, the obtaining characteristic information of the picture includes: determining a social group in which the picture is to be shared; and obtaining a group attribute of the social group.

The group attribute is attribute information of the social group. It may be understood that, in this embodiment, the picture is to be shared in the social group.

In an embodiment, the determining a social group in which the picture is to be shared includes: receiving a social group identifier corresponding to the picture; and the obtaining a group attribute of the social group includes: searching for a group attribute corresponding to the social group identifier.

Specifically, when uploading the picture to the server, the first terminal further transmits the social group identifier corresponding to the picture. After receiving the social group identifier, the server finds the group attribute corresponding to the social group identifier according to a pre-stored correspondence between the social group identifier and the group attribute.

In an embodiment, the server may alternatively determine a default social group as the social group in which the picture is to be shared. Correspondingly, the server obtains a group attribute of the default social group.

In an embodiment, the group attribute includes at least one of a quantity of members in the social group and activeness of the social group. The compressing the picture in a second compression manner in a case that the characteristic information meets a compression trigger condition, to obtain a compressed picture includes: compressing the picture in the second compression manner in a case that the quantity of members is greater than a group member quantity threshold and/or the activeness is greater than a preset activeness threshold, to obtain the compressed picture.

The activeness of the social group is an abstract value obtained through quantization on operations performed by group members in the social group. It may be understood that the activeness of the social group is used for reflecting whether the social group is accessed frequently. Higher activeness of the social group indicates that the social group is more frequently accessed by the group members.

In an embodiment, the activeness of the social group may be determined according to at least one of a quantity of messages transmitted in the social group, a message transmitting frequency, and a stay duration.

The server may preset the group member quantity threshold and/or the preset activeness threshold. The group member quantity threshold is a preset threshold of the quantity of group members. The preset activeness threshold is a preset threshold of the activeness of the social group.

In an embodiment, when the group attribute includes the quantity of members in the social group, the server may compare the obtained quantity of members in the social group with the group member quantity threshold, and compress the picture in the second compression manner when the quantity of members is greater than the group member quantity threshold, to obtain the compressed picture.

In an embodiment, when the group attribute includes the activeness of the social group, the server may compare the obtained activeness of the social group with the preset activeness threshold, and compress the pictured in the second compression manner when the activeness is greater than the preset activeness threshold, to obtain the compressed picture.

In an embodiment, when the group attribute includes both the quantity of members in the social group and the activeness of the social group, the server may compare the obtained quantity of members in the social group with the group member quantity threshold, and compare the obtained activeness of the social group with the preset activeness threshold; and compress the picture in the second compression manner when the quantity of members is greater than the group member quantity threshold and/or the activeness is greater than the preset activeness threshold, to obtain the compressed picture.

In an embodiment, the compressing the picture in a second compression manner in a case that the characteristic information meets a compression trigger condition, to obtain a compressed picture includes: obtaining a quantity of members in a social group in which the picture is to be shared in a case that the characteristic information meets the compression trigger condition; determining a member quantity section in which the obtained quantity of members is located; querying for a second compression manner corresponding to the determined member quantity section; and compressing the picture in the found second compression manner, to obtain a compressed picture. It may be understood that, in this embodiment, the picture is to be shared in the social group.

The member quantity section is a section obtained in advance through division according to a quantity of members. For example, "less than 10" is a member quantity section, "10 to 30" is a member quantity section, and "greater than 30" is another member quantity section.

The server may compare the obtained quantity of members with a preset member quantity section, to determine the member quantity section in which the obtained quantity of members is located. Because a correspondence between a member quantity section and a second compression manner is preset in the server, a second compression manner corresponding to the determined member quantity section may be found according to the correspondence. Then, the server may compress the picture in the found second compression manner, to obtain a compressed picture.

Using an example for description, if the member quantity section is "greater than 30", a corresponding second compression manner is an HEVC compression format with a quantization parameter of 25; and if the member quantity section is "10 to 30", a corresponding second compression manner is an H.264 compression format with a quantization parameter set to 25.

In the foregoing embodiment, the compression trigger condition is set by using the group attribute of the social group in which the picture is to be shared. The group attribute can generally reflect a potential quantity of downloading times of the picture. Therefore, it is more accurate to determine whether to perform compression by using the group attribute of the social group in which the picture is to be shared. In addition, because the group attribute can generally reflect the potential quantity of downloading times of the picture, the picture may be compressed more accurately by flexibly determining the second compression manner for picture compression according to the quantity of members in the social group.

In an embodiment, the characteristic information may include both the picture characteristic and the social characteristic. In this case, the compression trigger condition may include both a condition in the picture characteristic aspect and a condition in the social characteristic aspect. That is, the compression trigger condition includes the conditions in the two aspects.

In other words, the compressing the picture in a second compression manner in a case that the characteristic information meets a compression trigger condition, to obtain a compressed picture includes: compressing the picture in the second compression manner in a case that the characteristic information meets both the condition in the picture characteristic aspect and the condition in the social characteristic aspect, to obtain the compressed picture.

Using an example in which the picture characteristic includes the picture dimension, the condition in the picture characteristic aspect may be at least one of the following conditions: the picture dimension is within the preset dimension range; the product of the height and the width in the picture dimension is within the preset product range; and the ratio of the height to the width in the picture dimension is within the preset ratio range.

Using an example in which the social characteristic includes the group attribute, and the group attribute includes at least one of the quantity of members in the social group and the activeness of the social group, the condition in the social characteristic aspect may be any one of the following conditions: the quantity of members in the social group is greater than the group member quantity threshold; the activeness of the social group is greater than the preset activeness threshold; or the quantity of members in the social group is greater than the group member quantity threshold, and the activeness of the social group is greater than the preset activeness threshold.

In the foregoing embodiment, the compression trigger condition is set in two aspects, namely, the picture characteristic and the social characteristic. Whether to trigger compression on the picture is determined by using the picture characteristic and the social characteristic of the picture. A picture that needs to be compressed can be determined more easily and quickly, thereby saving system processing resources.

In an embodiment, the compressing the picture in a second compression manner in a case that the characteristic information meets a compression trigger condition, to obtain a compressed picture includes: compressing the picture respectively in different second compression manners in a case that the characteristic information meets the compression trigger condition, to obtain different compressed pictures. The returning the compressed picture in response to the picture download request includes: selecting a to-be-returned compressed picture from the different compressed pictures obtained through compression; and returning the selected compressed picture.

A plurality of second compression manners are preset in the server. When the characteristic information meets the compression trigger condition, the picture is compressed respectively in different second compression manners, to obtain different compressed pictures. When receiving the picture download request for the picture, the server may select a to-be-returned compressed picture from the different compressed pictures, and return the selected compressed picture.

It may be understood that, the server may compress the picture based on all the set second compression manners, to obtain different compressed pictures. In an embodiment, the server may alternatively select some second compression manners from the plurality of set second compression manners, and compress the picture in the selected different second compression manners, to obtain different compressed pictures.

In this embodiment, the picture is compressed respectively in different second compression manners to obtain different compressed pictures, then a to-be-returned compressed picture is selected from the different compressed pictures, and the selected compressed picture is returned. More choices are provided for picture downloading, thereby improving picture downloading efficiency.

In an embodiment, the selecting a to-be-returned compressed picture from the different compressed pictures obtained through compression includes: selecting, according to at least one of a picture format supported by a terminal transmitting the picture download request and a current network bandwidth, a to-be-returned compressed picture from the different compressed pictures obtained through compression; or selecting a compressed picture with a smallest size from the different compressed pictures obtained through compression.

In an embodiment, the server may select, according to the picture format supported by the terminal transmitting the picture download request, a to-be-returned compressed picture from the different compressed pictures obtained through compression. The terminal may transmit the picture download request by using a terminal application program run in the terminal.

The server may select, from the different compressed pictures obtained through compression, a compressed picture having the picture format supported by the terminal transmitting the picture download request. It may be understood that, there may be one or more picture formats supported by the terminal transmitting the picture download request, and therefore, there may be one or more compressed pictures conforming to the picture format supported by the terminal transmitting the picture download request.

In an embodiment, when there are a plurality of compressed pictures conforming to the picture format supported by the terminal transmitting the picture download request, the server may return all the selected compressed pictures. Alternatively, the server may select a compressed picture from the plurality of compressed pictures, and return the selected compressed picture. In an embodiment, the server may alternatively perform secondary selection in the plurality of compressed pictures conforming to the picture format supported by the terminal transmitting the picture download request, to select a compressed picture with a smallest size, and return the selected compressed picture with the smallest size. It may be understood that the server may alternatively select any one of the plurality of selected compressed pictures for feedback.

In an embodiment, the server may alternatively select, according to the current network bandwidth, a to-be-returned compressed picture from the different compressed pictures obtained through compression.

When the to-be-returned compressed picture is selected from the different compressed pictures obtained through compression according to the current network bandwidth, a size of the selected compressed picture is positively correlated to a size of the current network bandwidth. A larger current network bandwidth indicates a larger selected compressed picture; conversely, a smaller current network bandwidth indicates a smaller selected compressed picture.

In an embodiment, a correspondence between a network bandwidth range and a picture size range is preset in the server. Correspondingly, the server may determine a network bandwidth range in which the current network bandwidth is located; search, according to the correspondence, for a picture size range corresponding to the determined network bandwidth range; and then select, from the different compressed pictures, a compressed picture whose picture size is located in the found picture size range. It may be understood that, a higher level of the network bandwidth range corresponds to a higher level of the picture size range.

In an embodiment, when there are a plurality of compressed pictures whose picture sizes are located in the found picture size range, the server may select, from the plurality of compressed pictures, a compressed picture with a largest size. That is, a compressed picture with highest picture quality is returned provided that a requirement of the current network bandwidth is met. It may be understood that the server may alternatively select any one of the plurality of compressed pictures.

In an embodiment, the server may alternatively select a to-be-returned compressed picture from the different compressed pictures obtained through compression, while considering both the picture format supported by the terminal transmitting the picture download request and the current network bandwidth.

The server may select, according to the current network bandwidth, a to-be-returned compressed picture from the compressed pictures having the picture format supported by the terminal transmitting the picture download request. A size of the selected compressed picture is positively correlated to a size of the current network bandwidth.

In an embodiment, alternatively, the server may directly select the compressed picture with the smallest size from the different compressed pictures obtained through compression.

In the foregoing embodiments, the to-be-returned compressed picture is selected, according to at least one of the picture format supported by the terminal transmitting the picture download request and the current network bandwidth, from the different compressed pictures obtained through compression; or the compressed picture with the smallest size is selected from the different compressed pictures obtained through compression, so that the selected compressed picture is more accurate.

In an embodiment, the method further includes: performing, when a picture format of the received picture belongs to a first picture format set, the step of obtaining characteristic information of the picture. The compressing the picture in a second compression manner, to obtain a compressed picture includes: selecting a picture format from a second picture format set; and compressing the picture in a second compression manner matching the selected picture format, to obtain a compressed picture.

It may be understood that, in this embodiment, the first picture format set and the second picture format set are preset in the server. Each of the first picture format set and the second picture format set includes at least one picture format. The first picture format set and the second picture format set may be the same or may be different.

In an embodiment, the first picture format set or the second picture format set includes at least one of formats such as PNG, JPG, H.264, and HEVC.

The server may determine the picture format of the received picture, and compare the picture format of the picture with the first picture format set. When the picture format of the picture belongs to the first picture format set, the step of obtaining characteristic information of the picture is performed. When the characteristic information meets the compression trigger condition, the server may select a picture format from the second picture format set; and compress the picture in a second compression manner matching the selected picture format, to obtain a compressed picture.

A matching relationship between a picture format and a second compression manner is preset in the server. The server may determine, according to the matching relationship, the second compression manner matching the selected picture format, and then compress the picture in the determined second compression manner.

In an embodiment, when the picture format of the picture does not belong to the first picture format set, the step of obtaining characteristic information of the picture may not be performed; or the step of obtaining characteristic information of the picture may be performed after the picture format of the picture is added to the first picture format set. Alternatively, a picture format may be selected from the first picture format set, format conversion is performed on the picture according to the selected picture format, and then the step of obtaining characteristic information of the picture is performed on a picture obtained after the format conversion.

In an embodiment, the server may select a picture format from the second picture format set according to at least one of the picture format supported by the terminal transmitting the picture download request and the current network bandwidth.

In an embodiment, the server may alternatively determine the quantity of members in the social group in which the picture is to be shared, determine the member quantity section in which the obtained quantity of members is located, query for a picture format corresponding to the determined member quantity section, and select a picture format from the second picture format set according to the found picture format. It may be understood that, in this embodiment, a correspondence between a member quantity section and a picture format is pre-stored in the server, and the server queries, according to the correspondence, for the picture format corresponding to the determined member quantity section.

In the foregoing embodiments, the server performs picture format screening on the received picture by using the preset first picture format set, so that when the picture format of the received picture belongs to the first picture format set, it is more convenient to compress the picture by using the picture format in the second picture format set, to improve a compression speed. Setting the second picture format set facilitates rapid determining of the second compression manner, thereby improving a compression speed.

In an embodiment, the returning the compressed picture in response to the picture download request includes: obtaining, in response to the picture download request, a picture format supported by a terminal transmitting the picture download request; performing, in a case that the compressed picture does not conform to the obtained picture format, format conversion on the compressed picture according to the obtained picture format; and returning a picture obtained after the format conversion.

In an embodiment, the picture download request may include the picture format supported by the terminal transmitting the picture download request. After compressing the picture in the second compression manner and obtaining the compressed picture, the server may determine the picture format of the compressed picture. When the picture format of the compressed picture does not conform to the obtained picture format, the server may perform format conversion on the compressed picture according to the obtained picture format, and then return a picture obtained after the format conversion.

It may be understood that, the obtained picture format herein is the obtained picture format supported by the terminal transmitting the picture download request.

In the foregoing embodiments, when the compressed picture does not conform to the picture format supported by the terminal transmitting the picture download request, format conversion is performed on the compressed picture according to the picture format, and the picture obtained after the format conversion is returned, thereby improving accuracy of picture downloading.

In an embodiment, the second compression manner includes at least one of the picture compression format and the compression quality parameter. The method further includes: adjusting the picture compression format to a picture compression format with lower encoding complexity and/or adjusting the compression quality parameter to a compression quality parameter with a higher compression ratio during a preset network peak period.

The network peak period is a period in which a large quantity of users use network resources at the same time. It may be understood that the preset network peak period may be measured in a unit of date. For example, a major statutory holiday (for example, the Spring Festival) may be the preset network peak period. The preset network peak period may alternatively be measured in a unit of hour. For example, 19:30 to 23:30 in a day may be the preset network peak period.

The encoding complexity is complexity of picture encoding. It may be understood that higher encoding complexity indicates a higher compression ratio, a lower compression speed, and a larger quantity of machine resources occupied for compression. It may be understood that, the lower encoding complexity is complexity lower than encoding complexity of a current picture compression format in the second compression manner.

It may be understood that the compression quality parameter is used for representing quality of the compressed picture. A higher compression ratio of the compression quality parameter indicates worse quality of the compressed picture and a smaller size of the compressed picture. The higher compression ratio is a compression ratio higher than a compression ratio of a current compression quality parameter in the second compression manner.

In an embodiment, when entering the preset network peak period, the server may adjust the current picture compression format in the second compression manner to a picture compression format with lower encoding complexity. It may be understood that the encoding complexity of the picture compression format after the adjustment is lower than the encoding complexity of the picture compression format before the adjustment. For example, the HEVC format may be adjusted to the H.264 format. By adjusting the current picture compression format in the second compression manner to the picture compression format with lower encoding complexity, machine resources occupied for compression can be reduced, thereby reducing machine costs.

In an embodiment, when entering the preset network peak period, the server may alternatively adjust the current compression quality parameter in the second compression manner to a compression quality parameter with a higher compression ratio. It may be understood that, encoding quality corresponding to the compression quality parameter after the adjustment is worse than the encoding quality corresponding to the compression quality parameter before the adjustment. Therefore, by adjusting the current compression quality parameter in the second compression manner to a compression quality parameter with a higher compression ratio, the compressed picture can be smaller, thereby reducing a network bandwidth occupied when returning the compressed picture.

The compression ratio of the adjusted second compression manner is higher than the compression ratio of the first compression manner.

It may be understood that, after the preset network peak period, the picture compression format and the compression quality parameter in the second compression manner may be restored to a state before the adjustment.

When the compression quality parameter is the quantization parameter, the server may increase a current quantization parameter in the second compression manner to a quantization parameter with a higher compression ratio. It may be understood that, a larger quantization parameter indicates worse quality of the compressed picture and a higher compression ratio. When the compression quality parameter is the image quality factor, the server may decrease a current image quality factor in the second compression manner to an image quality factor with a higher compression ratio. It may be understood that, a smaller image quality factor indicates worse quality of the compressed picture and a higher compression ratio.

Figure 4:
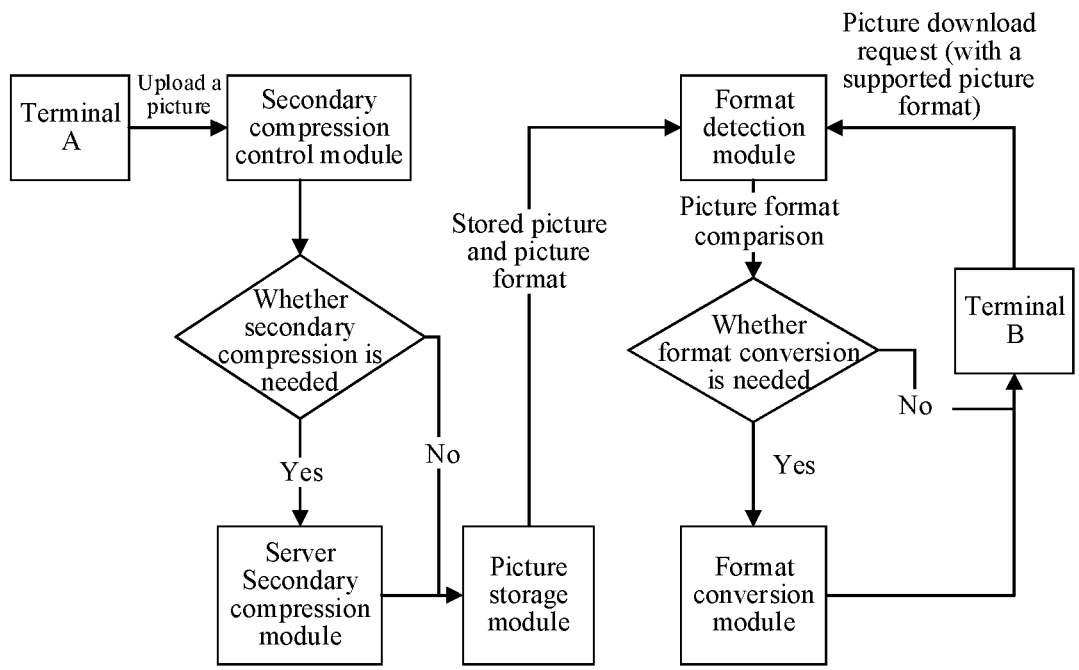
FIG. 4 is a schematic principle diagram of a picture sharing method according to an embodiment.

FIG. 4 is a schematic principle diagram of a picture sharing method according to an embodiment. FIG. 4 includes a terminal A, a server, and a terminal B. The server includes a secondary compression control module, a secondary compression module, a picture storage module, a format conversion module, and a format detection module. The secondary compression control module is configured to determine whether to perform secondary compression on an uploaded picture. The format detection module is configured to detect a picture format supported by the terminal B requesting to download the picture, to determine whether format conversion needs to be performed on the picture stored in the picture storage module.

Referring to FIG. 4, the terminal A uploads a picture, the picture being compressed in a first compression manner in an uploading process. The secondary compression control module determines whether secondary compression needs to be performed on the uploaded picture. If yes, the secondary compression module is instructed to perform secondary compression, and then a picture obtained after the secondary compression is transmitted to the picture storage module for storage. If no, the picture is directly transmitted to the picture storage module for storage. The terminal B transmits a picture download request. The format detection module compares a picture format of the stored picture (compressed or not compressed) with the picture format supported by the terminal B, to determine whether format conversion needs to be performed. If yes, the format conversion module is instructed to perform format conversion on the stored picture according to the picture format supported by the terminal B, and a picture obtained after the conversion is returned to the terminal B. If no, the stored picture is directly returned to the terminal B.

Figure 5:
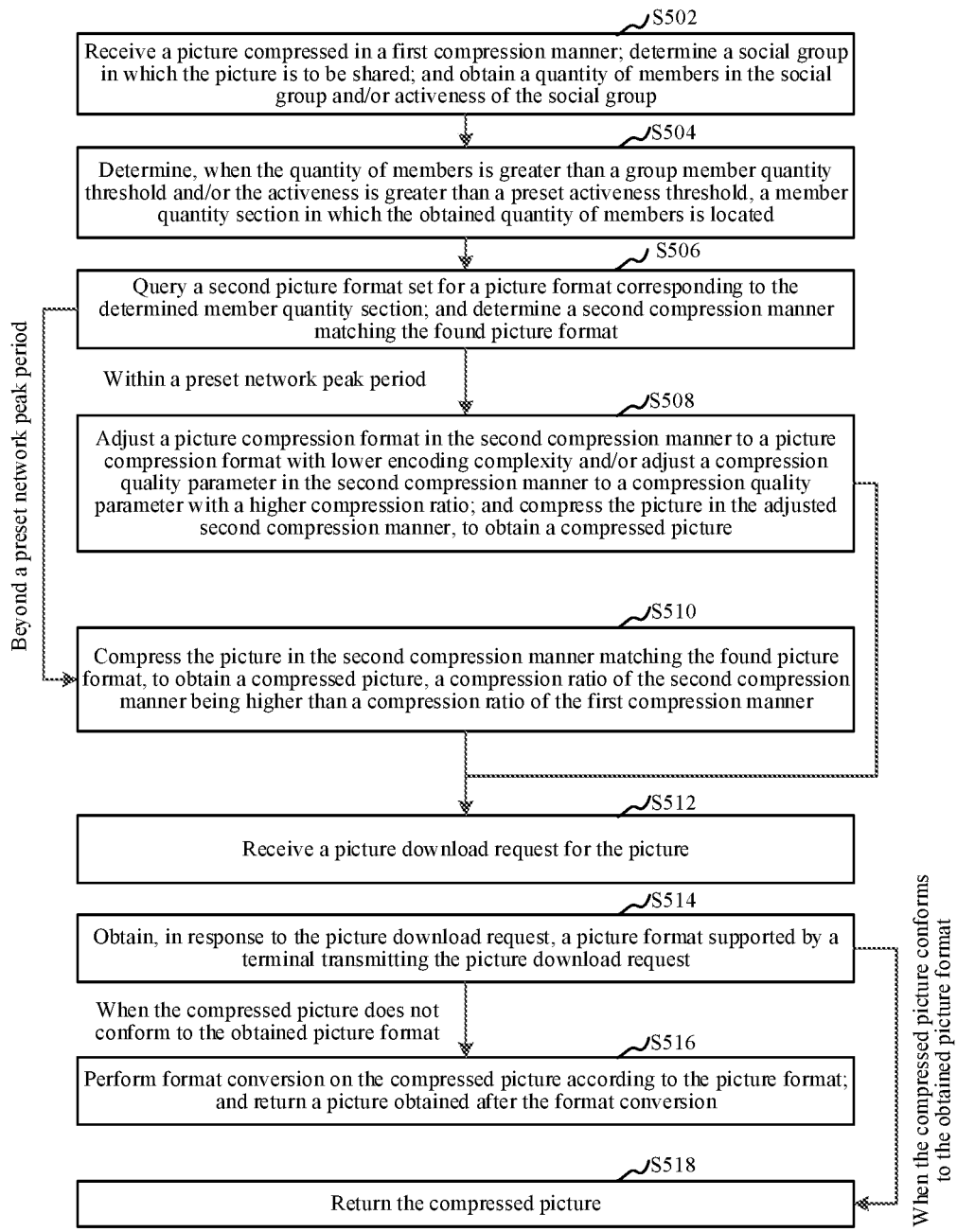
FIG. 5 is a schematic flowchart of a picture sharing method according to another embodiment.

As shown in FIG. 5, in an embodiment, a picture sharing method is provided. The method is performed by the server 120 in FIG. 1, and includes the following steps:

S502: Receive a picture compressed in a first compression manner; determine a social group in which the picture is to be shared; and obtain a quantity of members in the social group and/or activeness of the social group.

In an embodiment, when the first compression manner belongs to a first picture format set, step S502 is performed.

S504: Determine, when the quantity of members is greater than a group member quantity threshold and/or the activeness is greater than a preset activeness threshold, a member quantity section in which the obtained quantity of members is located.

S506: Query a second picture format set for a picture format corresponding to the determined member quantity section; and determine a second compression manner matching the found picture format.

When a current time is within a preset network peak period, step S508 is performed. When a current time is beyond a preset network peak period, step S510 is performed.

S508: Adjust a picture compression format in the second compression manner to a picture compression format with lower encoding complexity and/or adjust a compression quality parameter in the second compression manner to a compression quality parameter with a higher compression ratio; and compress the picture in the adjusted second compression manner, to obtain a compressed picture.

A compression ratio of the adjusted second compression manner is higher than a compression ratio of the first compression manner.

S510: Compress the picture in the second compression manner matching the found picture format, to obtain a compressed picture, a compression ratio of the second compression manner being higher than the compression ratio of the first compression manner.

S512: Receive a picture download request for the picture.

S514: Obtain, in response to the picture download request, a picture format supported by a terminal transmitting the picture download request.

When the compressed picture does not conform to the obtained picture format, step S516 is performed. When the compressed picture conforms to the obtained picture format, step S518 is performed.

S516: Perform format conversion on the compressed picture according to the picture format; and return a picture obtained after the format conversion.

S518: Return the compressed picture.

In the foregoing picture sharing method, whether secondary compression needs to be performed on the picture is determined by using a group attribute, and the second compression manner is determined according to the quantity of members in the social group in the group attribute, to perform secondary compression on the picture, thereby improving accuracy of compression. Then, the compressed picture is returned. Because the compressed picture has a smaller size than the received picture, a network bandwidth occupied in a picture feedback process is reduced.

Figure 6:
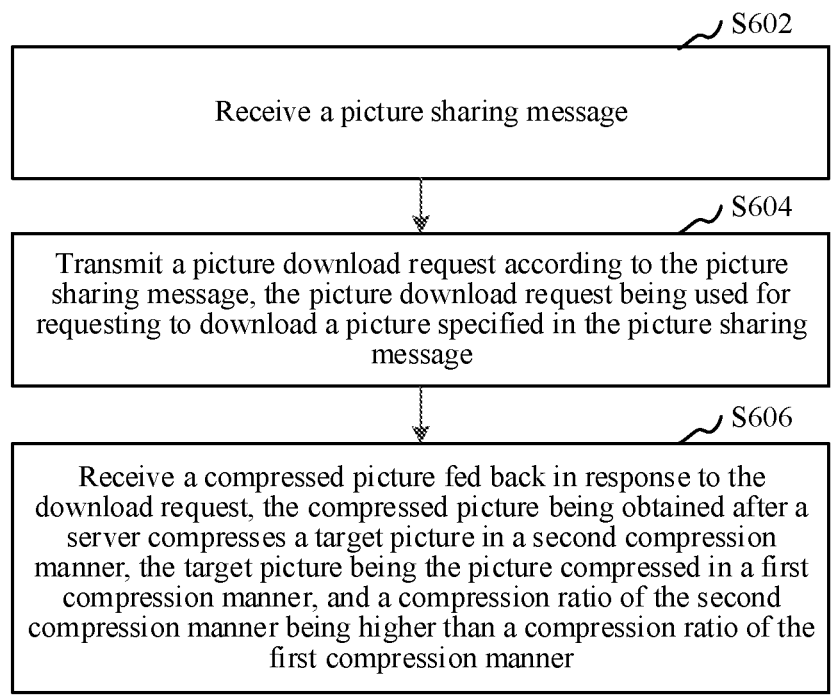
FIG. 6 is a schematic flowchart of a picture sharing method according to still another embodiment.

As shown in FIG. 6, in an embodiment, a picture sharing method is provided. Description is made by using an example in which the method is applied to the second terminal 130 in FIG. 1. The method includes the following steps:

S602: Receive a picture sharing message.

The picture sharing message is a message used for sharing a picture.

In an embodiment, the picture sharing message may include a thumbnail of the picture. In another embodiment, the picture sharing message may include a picture sharing link address.

After compressing a picture uploaded by the first terminal and obtaining a compressed picture, the server may transmit the picture sharing message to the second terminal. It may be understood that the picture uploaded by the first terminal is compressed in a first compression manner.

S604: Transmit a picture download request according to the picture sharing message, the picture download request being used for requesting to download a picture specified in the picture sharing message.

In an embodiment, after receiving the picture sharing message, the second terminal may actively generate the picture download request used for requesting to download the picture specified in the picture sharing message, and transmit the picture download request to the server.

In an embodiment, the second terminal may alternatively trigger generation of the picture download request after receiving a triggering operation on the picture sharing message, and transmit the picture download request to the server.

S606: Receive a compressed picture returned in response to the download request, the compressed picture being obtained after a server compresses a target picture in a second compression manner, the target picture being the picture compressed in a first compression manner, and a compression ratio of the second compression manner being higher than a compression ratio of the first compression manner.

After receiving the picture download request transmitted by the second terminal, the server may obtain, in response to the download request, characteristic information of the picture, and compress the picture in the second compression manner when the characteristic information meets a compression trigger condition, to obtain the compressed picture.

Figure 7A:
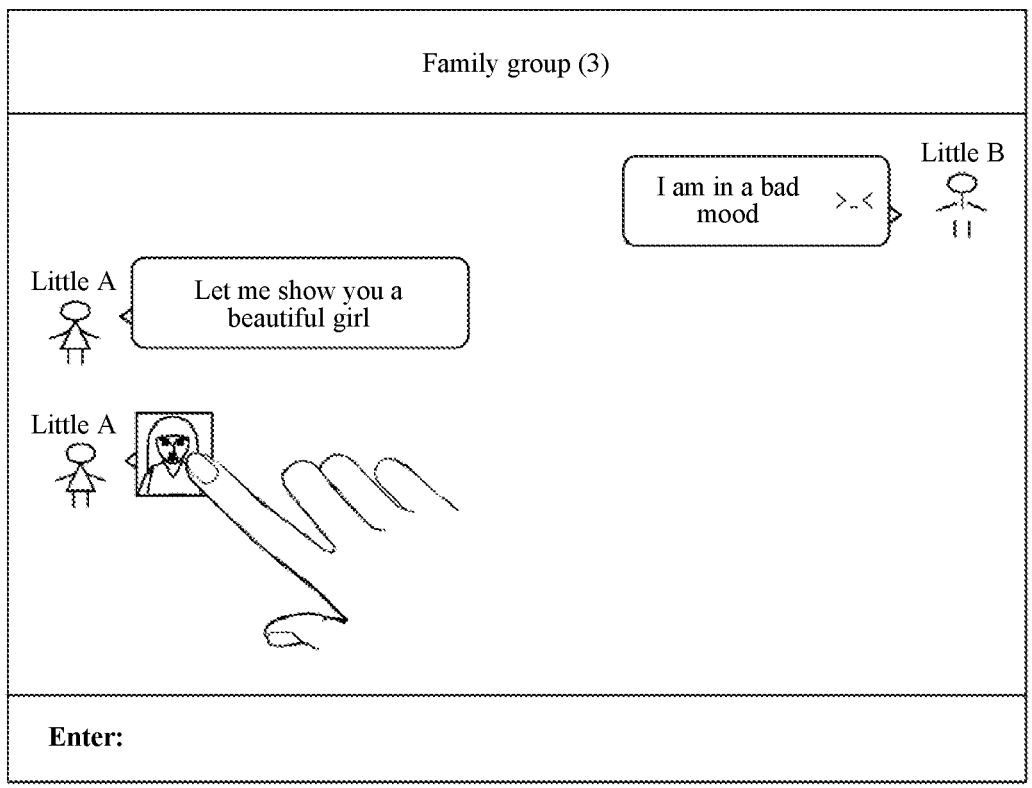
FIG. 7A and FIG. 7B are schematic diagrams of a picture download interface according to an embodiment.
Figure 7B:
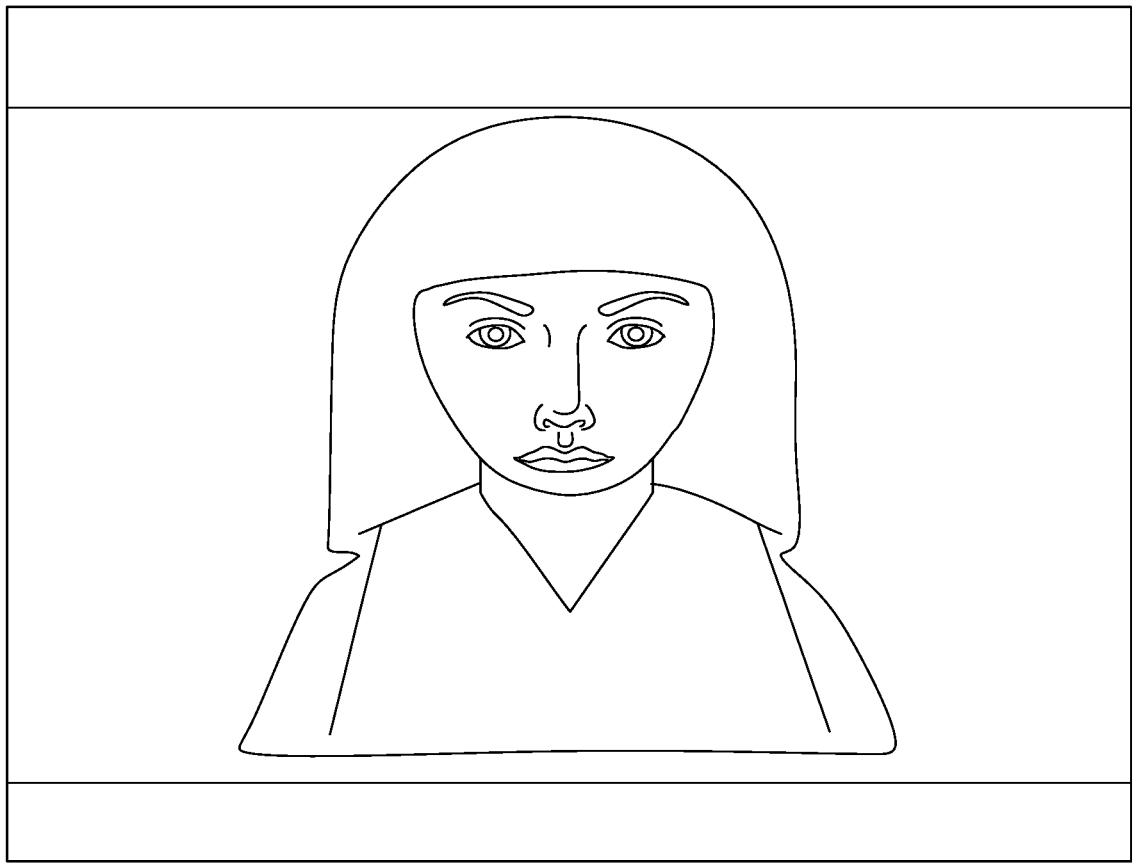

FIG. 7A and FIG. 7B are schematic diagrams of a picture download interface according to an embodiment. Referring to FIG. 7A, the second terminal displays a picture sharing message in a form of a thumbnail. A user performs a triggering operation on the thumbnail, so that the second terminal generates a picture download request, and transmits the picture download request to the server. FIG. 7B shows a compressed picture that is returned by the server in response to the picture download request.

In the foregoing picture sharing method, a compressed picture is received, which is obtained by the server through compression in the second compression manner whose compression ratio is higher than that of the first compression manner. Because the compressed picture has a smaller size than the picture compressed in the first compression manner and uploaded to the server, a network bandwidth occupied in a picture feedback process is reduced.

In an embodiment, the method further includes: reporting a locally supported picture format, the reported picture format being used for instructing the server to select, in a case that there are compressed pictures conforming to the reported picture format, a compressed picture with a smallest size from the compressed pictures conforming to the reported picture format; or generate, in a case that there is no compressed picture conforming to the reported picture format, a compressed picture instantly according to the reported picture format for feedback.

The second terminal may further report the locally supported picture format to the server. In an embodiment, the second terminal may add the locally supported picture format to the picture download request, to report the locally supported picture format to the server.

It may be understood that, when there is a compressed picture conforming to the reported picture format in the server, the compressed picture may be directly returned to the second terminal. When there is no compressed picture conforming to the reported picture format in the server, the reported picture format is used for instructing the server to perform format conversion instantly according to the picture format, to generate a compressed picture, and return the generated compressed picture.

In an embodiment, when a plurality of compressed pictures conforming to the reported picture format are stored, the server may select, from the plurality of compressed pictures, a compressed picture with a smallest size for feedback.

Figure 8:
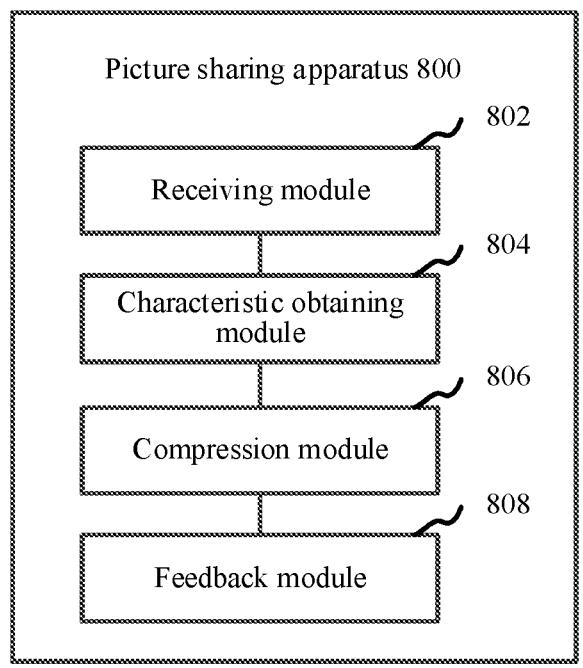
FIG. 8 is a block diagram of a picture sharing apparatus according to an embodiment.

As shown in FIG. 8, in an embodiment, a picture sharing apparatus 800 is provided. The apparatus 800 includes: a receiving module 802, a characteristic obtaining module 804, a compression module 806, and a feedback module 808.

The receiving module 802 is configured to receive a picture compressed in a first compression manner.

The characteristic obtaining module 804 is configured to obtain characteristic information of the picture.

The compression module 806 is configured to compress the picture in a second compression manner in a case that the characteristic information meets a compression trigger condition, to obtain a compressed picture.

The receiving module 802 is further configured to receive a picture download request for the picture.

The feedback module 808 is configured to return the compressed picture in response to the picture download request.

In an embodiment, the characteristic information includes a picture dimension of the picture, and the compression trigger condition includes at least one of the following conditions: the picture dimension is within a preset dimension range; a product of a height and a width in the picture dimension is within a preset product range; and a ratio of the height to the width in the picture dimension is within a preset ratio range.

In an embodiment, the characteristic information includes a group attribute, and the characteristic obtaining module 804 is further configured to determine a social group in which the picture is to be shared; and obtain a group attribute of the social group.

In an embodiment, the group attribute includes a quantity of members in the social group and/or activeness of the social group, and the compression module 806 is further configured to compress the picture in the second compression manner in a case that the quantity of members is greater than a group member quantity threshold and/or the activeness is greater than a preset activeness threshold, to obtain the compressed picture.

In an embodiment, the compression module 806 is further configured to obtain a quantity of members in a social group in which the picture is to be shared in a case that the characteristic information meets the compression trigger condition; determine a member quantity section in which the obtained quantity of members is located; query for a second compression manner corresponding to the determined member quantity section; and compress the picture in the found second compression manner, to obtain a compressed picture.

In an embodiment, the compression module 806 is further configured to compress the picture respectively in different second compression manners in a case that the characteristic information meets the compression trigger condition, to obtain different compressed pictures.

The feedback module 808 is further configured to select a to-be-returned compressed picture from the different compressed pictures obtained through compression; and return the selected compressed picture.

In an embodiment, the feedback module 808 is further configured to select, according to at least one of a picture format supported by a terminal transmitting the picture download request and a current network bandwidth, a to-be-returned compressed picture from the different compressed pictures obtained through compression; or select a compressed picture with a smallest size from the different compressed pictures obtained through compression.

In an embodiment, the characteristic obtaining module 804 is further configured to perform, when a picture format of the received picture belongs to a first picture format set, the step of obtaining characteristic information of the picture. The compression module 806 is further configured to select a picture format from a second picture format set; and compress the picture in a second compression manner matching the selected picture format, to obtain a compressed picture.

In an embodiment, the feedback module 808 is further configured to obtain, in response to the picture download request, a picture format supported by a terminal transmitting the picture download request; perform, in a case that the compressed picture does not conform to the obtained picture format, format conversion on the compressed picture according to the obtained picture format; and return a picture obtained after the format conversion.

In an embodiment, the second compression manner includes at least one of a picture compression format and a compression quality parameter. The compression module 806 is further configured to adjust the picture compression format to a picture compression format with lower encoding complexity and/or adjust the compression quality parameter to a compression quality parameter with a higher compression ratio during a preset network peak period.

In an embodiment, the feedback module 808 is further configured to directly store the picture when the characteristic information does not meet the compression trigger condition; and return, when the picture download request for the picture is received, the stored picture in response to the picture download request.

In the foregoing picture sharing apparatus, after the picture compressed in the first compression manner is received, the characteristic information of the picture is obtained. When the characteristic information meets the compression trigger condition, the picture is then compressed in the second compression manner. Such processing is equivalent to performing characteristic analysis on the picture and then determining whether to compress the picture based on an analysis result. The compressed picture obtained in this way can have a smaller size and meet a quality requirement to some extent. After the picture download request for the picture is received, the picture fed back is also a compressed picture. Because the compressed picture returned has a smaller size than the received picture, a network bandwidth occupied in a picture feedback process is reduced.

Figure 9:
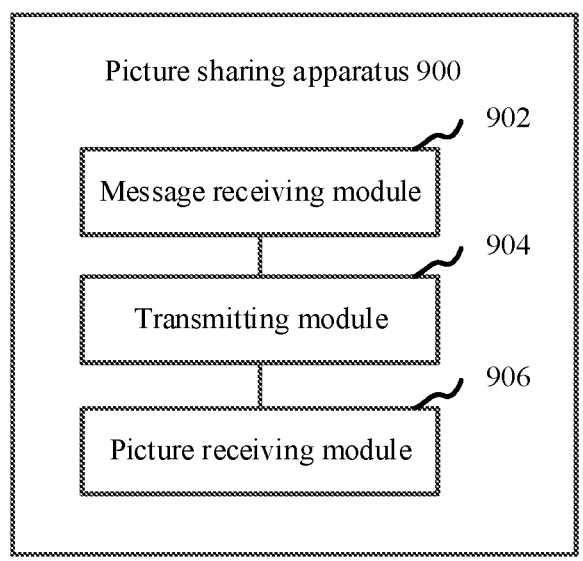
FIG. 9 is a block diagram of a picture sharing apparatus according to another embodiment.

As shown in FIG. 9, in an embodiment, a picture sharing apparatus 900 is provided. The apparatus 900 includes: a message receiving module 902, a transmitting module 904, and a picture receiving module 906.

The message receiving module 902 is configured to receive a picture sharing message.

The transmitting module 904 is configured to transmit a picture download request according to the picture sharing message, the picture download request being used for requesting to download a picture specified in the picture sharing message.

The picture receiving module 906 is configured to receive a compressed picture returned in response to the download request, the compressed picture being obtained after a server compresses a target picture in a second compression manner, and the target picture being the picture compressed in a first compression manner.

In an embodiment, the transmitting module 904 is further configured to report a locally supported picture format; the reported picture format being used for instructing the server to select, in a case that there are compressed pictures conforming to the reported picture format, a compressed picture with a smallest size from the compressed pictures conforming to the reported picture format; or generate, in a case that there is no compressed picture conforming to the reported picture format, a compressed picture instantly according to the reported picture format for feedback.

In the foregoing picture sharing apparatus, a compressed picture is received, which is obtained by the server through compression in the second compression manner. Because the compressed picture has a smaller size than the picture compressed in the first compression manner and uploaded to the server, a network bandwidth occupied in a picture feedback process is reduced.

Figure 10:
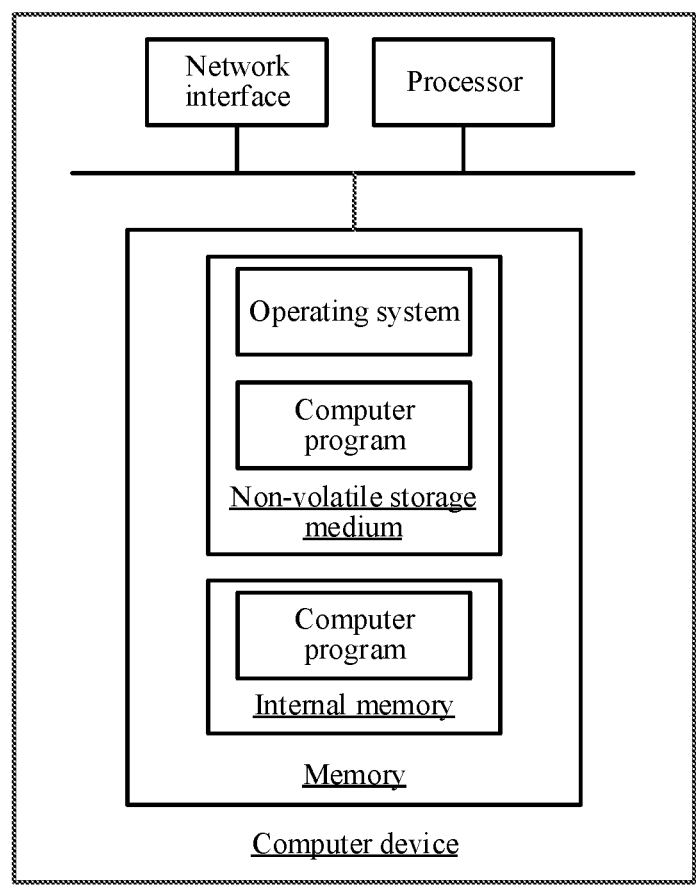
FIG. 10 is a schematic diagram of an internal structure of a computer device according to an embodiment.

FIG. 10 is a schematic diagram of an internal structure of a computer device according to an embodiment. Referring to FIG. 10, the computer device may be the server shown in FIG. 1. The computer device includes a processor, a memory, and a network interface that are connected by using a system bus. The memory includes a non-volatile storage medium and an internal memory. The non-volatile storage medium of the computer device may store an operating system and a computer program. The computer program, when executed, may cause the processor to perform a picture sharing method. The processor of the computer device is configured to provide computing and control capabilities, to support running of the entire computer device. The internal memory may store a computer program. The computer program, when executed by the processor, may cause the processor to perform a picture sharing method. The network interface of the computer device is configured to perform network communication.

A person skilled in the art may understand that, the structure shown in FIG. 10 is merely a partial structure related to the solution of this application, and does not limit the computer device to which the solution of this application is applied. Specifically, the computer device may include more or fewer components than those shown in the figure, or some components may be combined, or a different component deployment may be used.

In an embodiment, the picture sharing apparatus provided in this application may be implemented in a form of a computer program. The computer program may run on the computer device shown in FIG. 11. The non-volatile storage medium of the computer device may store program modules of the picture sharing apparatus, for example, the receiving module 802, the characteristic obtaining module 804, the compression module 806, and the feedback module 808 shown in FIG. 8. The computer program including the program modules is configured to cause the computer device to perform the steps in the picture sharing method in the embodiments of this application described in this specification. For example, the computer device may receive a picture compressed in a first compression manner by using the receiving module 802 in the picture sharing apparatus 800 shown in FIG. 8, and obtain characteristic information of the picture by using the characteristic obtaining module 804. The computer device may compress, by using the compression module 806, the picture in a second compression manner in a case that the characteristic information meets a compression trigger condition, to obtain a compressed picture. The computer device may receive a picture download request for the picture by using the receiving module 802, and return the compressed picture in response to the picture download request by using the feedback module 808.

Figure 11:
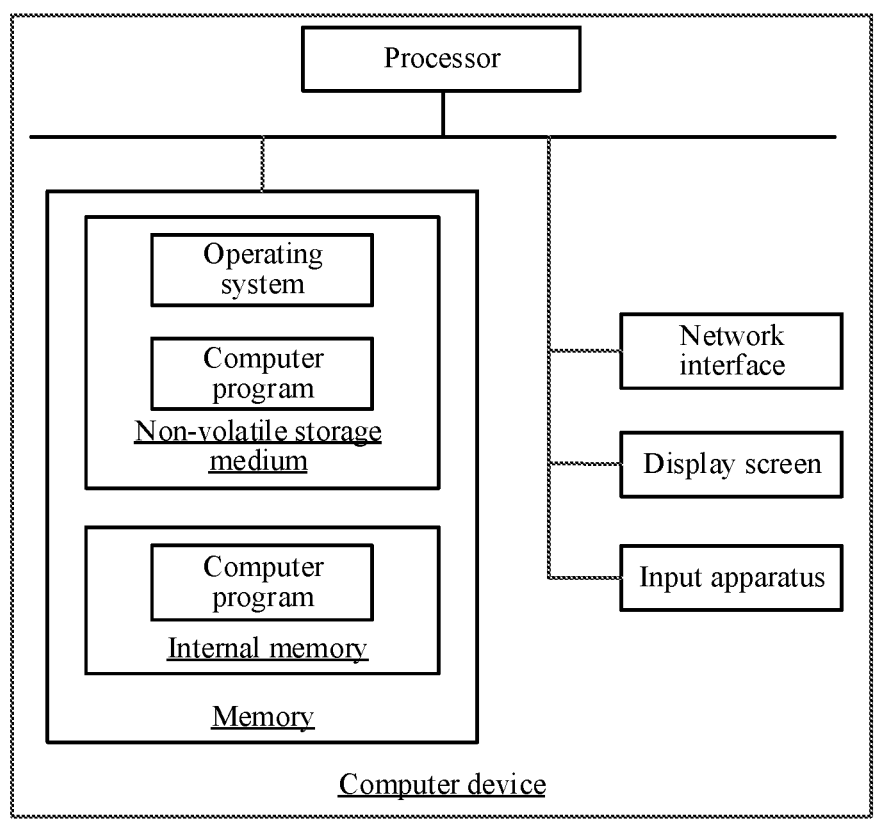
FIG. 11 is a schematic diagram of an internal structure of a computer device according to another embodiment.

FIG. 11 is a schematic diagram of an internal structure of a computer device according to an embodiment. Referring to FIG. 11, the computer device may be the first terminal or the second terminal shown in FIG. 1. The computer device includes a processor, a memory, a network interface, a display screen, and an input apparatus that are connected by using a system bus. The memory includes a non-volatile storage medium and an internal memory. The non-volatile storage medium of the computer device may store an operating system and a computer program. The computer program, when executed, may cause the processor to perform a picture sharing method. The processor of the computer device is configured to provide computing and control capabilities, to support running of the entire computer device. The internal memory may store a computer program. The computer program, when executed by the processor, may cause the processor to perform a picture sharing method. The network interface of the computer device is configured to perform network communication. The display screen of the computer device may be a liquid crystal display screen or an electronic ink display screen. The input apparatus of the computer device may be a touch layer covering the display screen, or may be a button, a trackball, or a touch panel disposed on a housing of the terminal, or may be an external keyboard, touch panel, mouse, or the like. The computer device may be a personal computer, a mobile terminal, or an in-vehicle device. The mobile terminal includes at least one of a mobile phone, a tablet computer, a personal digital assistant, a wearable device, or the like.

A person skilled in the art may understand that, the structure shown in FIG. 11 is merely a partial structure related to the solution of this application, and does not limit the computer device to which the solution of this application is applied. Specifically, the computer device may include more or fewer components than those shown in the figure, or some components may be combined, or a different component deployment may be used.

In an embodiment, the picture sharing apparatus provided in this application may be implemented in a form of a computer program. The computer program may run on the computer device shown in FIG. 11. The non-volatile storage medium of the computer device may store program modules of the picture sharing apparatus, for example, the message receiving module 902, the transmitting module 904, and the picture receiving module 906 shown in FIG. 9. The computer program including the program modules is configured to cause the computer device to perform the steps in the picture sharing method in the embodiments of this application described in this specification. For example, the computer device may receive a picture sharing message by using the message receiving module 902 in the picture sharing apparatus 900 shown in FIG. 9, and transmit a picture download request according to the picture sharing message by using the transmitting module 904, the picture download request being used for requesting to download a picture specified in the picture sharing message. The computer device may receive, by using the picture receiving module 906, a compressed picture returned in response to the download request, the compressed picture being obtained after a server compresses a target picture in a second compression manner, and the target picture being the picture compressed in a first compression manner.

In an embodiment, a computer device is provided, including a memory and a processor. The memory stores a computer program. The computer program, when executed by the processor, causes the processor to perform the picture sharing method performed by the server in the foregoing embodiments.

In an embodiment, a storage medium storing a computer program is provided. The computer program, when executed by a processor, causes the processor to perform the picture sharing method performed by the server in the foregoing embodiments.

In an embodiment, a computer device is provided, including a memory and a processor. The memory stores a computer program. The computer program, when executed by the processor, causes the processor to perform the picture sharing method performed by the first terminal or the second terminal in the foregoing embodiments.

In an embodiment, a storage medium storing a computer program is provided. The computer program, when executed by a processor, causes the processor to perform the picture sharing method performed by the first terminal or the second terminal in the foregoing embodiments.

It is to be understood that steps in the embodiments of this application are not necessarily performed in a sequence indicated by the step numbers. Unless explicitly specified in this specification, the steps are performed without any strict sequence limit, and may be performed in other sequence. Moreover, at least some of the steps in each embodiment may include a plurality of sub-steps or a plurality of stages. The sub-steps or stages are not necessarily performed at the same moment, but may be performed at different moments. The sub-steps or stages are not necessarily sequentially performed, but may be performed in turn or alternately with other steps or at least some of sub-steps or stages of other steps.

A person of ordinary skill in the art may understand that all or some of the processes in the method of the foregoing embodiments may be implemented and completed by using the computer program to instruct related hardware. The program may be stored in a non-volatile computer-readable storage medium, and the program, when executed, may include the processes of the foregoing method embodiments. Any reference to a memory, storage, database or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of illustration rather than limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only show several implementations of the present disclosure and are described specifically and in detail, but they cannot be construed as a limit to the patent scope of the present disclosure. A person of ordinary skill in the art may make various changes and improvements without departing from the ideas of the present disclosure, which shall all fall within the protection scope of the present disclosure. Therefore, the protection scope of the patent of the present disclosure shall be subject to the appended claims.

What is claimed is:

1. A picture sharing method, applied to a server having one or more processors and memory storing a plurality of programs to be executed by the one or more processors, and the method comprising:
    obtaining a picture compressed in a first compression manner;
    obtaining characteristic information of the picture, further comprising:
    determining a social group in which the picture is to be shared; and
    obtaining a group attribute of the social group, the group attribute comprising a quantity of members in the social group and/or activeness of the social group;
    compressing the picture in a second compression manner in a case that the characteristic information meets a compression trigger condition, to obtain a compressed picture, wherein the second compression manner has a higher compression ratio than the first compression manner, and the characteristic information meets the compression trigger condition when the quantity of members is greater than a group member quantity threshold and/or the activeness is greater than a preset activeness threshold;
    receiving a picture download request for the picture; and
    returning the compressed picture in response to the picture download request.

2. The method according to claim 1, wherein the characteristic information comprises a picture dimension of the picture; and
    the compression trigger condition comprises at least one of the following conditions:
    the picture dimension is within a preset dimension range;
    a product of a height and a width in the picture dimension is within a preset product range; and
    a ratio of the height to the width in the picture dimension is within a preset ratio range.

3. The method according to claim 1, wherein the compressing the picture in a second compression manner in a case that the characteristic information meets a compression trigger condition, to obtain a compressed picture comprises:
    determining a member quantity section in which the quantity of members is located;
    querying for a second compression manner corresponding to the determined member quantity section; and
    compressing the picture in the found second compression manner, to obtain a compressed picture.

4. The method according to claim 1, wherein the compressing the picture in a second compression manner in a case that the characteristic information meets a compression trigger condition, to obtain a compressed picture comprises:
    compressing the picture respectively in different second compression manners in a case that the characteristic information meets the compression trigger condition, to obtain different compressed pictures; and
    the returning the compressed picture in response to the picture download request comprises:
    selecting a to-be-returned compressed picture from the different compressed pictures obtained through compression; and
    returning the selected compressed picture.

5. The method according to claim 4, wherein the selecting a to-be-returned compressed picture from the different compressed pictures obtained through compression comprises:
    selecting, according to at least one of a picture format supported by a terminal transmitting the picture download request and a current network bandwidth, a to-be-returned compressed picture from the different compressed pictures obtained through compression; or
    selecting a compressed picture with a smallest size from the different compressed pictures obtained through compression.

6. The method according to claim 1, wherein the returning the compressed picture in response to the picture download request comprises:
    obtaining, in response to the picture download request, a picture format supported by a terminal transmitting the picture download request;
    performing, in a case that the compressed picture does not conform to the obtained picture format, format conversion on the compressed picture according to the picture format; and
    returning a picture having the picture format supported by the terminal and obtained after the format conversion.

7. The method according to claim 1, wherein the second compression manner comprises at least one of a picture compression format and a compression quality parameter, and the method further comprises:
    adjusting the picture compression format to a picture compression format with lower encoding complexity and/or adjusting the compression quality parameter to a compression quality parameter with a higher compression ratio during a preset network peak period.

8. A computer device, comprising a memory and a processor, the memory storing a computer program that, when executed by the processor, causes the processor to perform a plurality of operations including:
    obtaining a picture compressed in a first compression manner;
    obtaining characteristic information of the picture, further comprising:
    determining a social group in which the picture is to be shared; and
    obtaining a group attribute of the social group, the group attribute comprising a quantity of members in the social group and/or activeness of the social group;
    compressing the picture in a second compression manner in a case that the characteristic information meets a compression trigger condition, to obtain a compressed picture, wherein the second compression manner has a higher compression ratio than the first compression manner, and the characteristic information meets the compression trigger condition when the quantity of members is greater than a group member quantity threshold and/or the activeness is greater than a preset activeness threshold;
    receiving a picture download request for the picture; and
    returning the compressed picture in response to the picture download request.

9. The computer device according to claim 8, wherein the characteristic information comprises a picture dimension of the picture; and
the compression trigger condition comprises at least one of the following conditions:
the picture dimension is within a preset dimension range;
a product of a height and a width in the picture dimension is within a preset product range; and
a ratio of the height to the width in the picture dimension is within a preset ratio range.

10. The computer device according to claim 8, wherein the compressing the picture in a second compression manner in a case that the characteristic information meets a compression trigger condition, to obtain a compressed picture comprises:
determining a member quantity section in which the obtained quantity of members is located;
querying for a second compression manner corresponding to the determined member quantity section; and
compressing the picture in the found second compression manner, to obtain a compressed picture.

11. The computer device according to claim 8, wherein the compressing the picture in a second compression manner in a case that the characteristic information meets a compression trigger condition, to obtain a compressed picture comprises:
compressing the picture respectively in different second compression manners in a case that the characteristic information meets the compression trigger condition, to obtain different compressed pictures; and
the returning the compressed picture in response to the picture download request comprises:
selecting a to-be-returned compressed picture from the different compressed pictures obtained through compression; and
returning the selected compressed picture.

12. The computer device according to claim 11, wherein the selecting a to-be-returned compressed picture from the different compressed pictures obtained through compression comprises:
selecting, according to at least one of a picture format supported by a terminal transmitting the picture download request and a current network bandwidth, a to-be-returned compressed picture from the different compressed pictures obtained through compression; or
selecting a compressed picture with a smallest size from the different compressed pictures obtained through compression.

13. The computer device according to claim 8, wherein the returning the compressed picture in response to the picture download request comprises:
obtaining, in response to the picture download request, a picture format supported by a terminal transmitting the picture download request;
performing, in a case that the compressed picture does not conform to the obtained picture format, format conversion on the compressed picture according to the picture format; and
returning a picture having the picture format supported by the terminal and obtained after the format conversion.

14. The computer device according to claim 8, wherein the second compression manner comprises at least one of a picture compression format and a compression quality parameter and the plurality of operations further comprise:
adjusting the picture compression format to a picture compression format with lower encoding complexity and/or adjusting the compression quality parameter to a compression quality parameter with a higher compression ratio during a preset network peak period.

15. A non-transitory computer readable storage medium storing a computer program that, when executed by a processor of a computer device, causes the computer device to perform a plurality of operations including:
obtaining a picture compressed in a first compression manner;
determining a social group in which the picture is to be shared; and
obtaining a group attribute of the social group, the group attribute comprising a quantity of members in the social group and/or activeness of the social group;
compressing the picture in a second compression manner in a case that the characteristic information meets a compression trigger condition, to obtain a compressed picture, wherein the second compression manner has a higher compression ratio than the first compression manner, and the characteristic information meets the compression trigger condition when the quantity of members is greater than a group member quantity threshold and/or the activeness is greater than a preset activeness threshold;
receiving a picture download request for the picture; and
returning the compressed picture in response to the picture download request.

16. The non-transitory computer readable storage medium according to claim 15, wherein the returning the compressed picture in response to the picture download request comprises:
obtaining, in response to the picture download request, a picture format supported by a terminal transmitting the picture download request;
performing, in a case that the compressed picture does not conform to the obtained picture format, format conversion on the compressed picture according to the picture format; and
returning a picture having the picture format supported by the terminal and obtained after the format conversion.

17. The non-transitory computer readable storage medium according to claim 15, wherein the compressing the picture in a second compression manner in a case that the characteristic information meets a compression trigger condition, to obtain a compressed picture comprises:
determining a member quantity section in which the obtained quantity of members is located;
querying for a second compression manner corresponding to the determined member quantity section; and
compressing the picture in the found second compression manner, to obtain a compressed picture.

18. The non-transitory computer readable storage medium according to claim 15, wherein the compressing the picture in a second compression manner in a case that the characteristic information meets a compression trigger condition, to obtain a compressed picture comprises:
compressing the picture respectively in different second compression manners in a case that the characteristic information meets the compression trigger condition, to obtain different compressed pictures; and
the returning the compressed picture in response to the picture download request comprises:
selecting a to-be-returned compressed picture from the different compressed pictures obtained through compression; and
returning the selected compressed picture.

19. The non-transitory computer readable storage medium according to claim 18, wherein the selecting a to-be-returned compressed picture from the different compressed pictures obtained through compression comprises:
- selecting, according to at least one of a picture format supported by a terminal transmitting the picture download request and a current network bandwidth, a to-be-returned compressed picture from the different compressed pictures obtained through compression; or
- selecting a compressed picture with a smallest size from the different compressed pictures obtained through compression.

20. The non-transitory computer readable storage medium according to claim 15, wherein the characteristic information comprises a picture dimension of the picture; and
the compression trigger condition comprises at least one of the following conditions:
the picture dimension is within a preset dimension range;
a product of a height and a width in the picture dimension is within a preset product range; and
a ratio of the height to the width in the picture dimension is within a preset ratio range.

* * * * *